(12) United States Patent
Rapson

(10) Patent No.: US 9,095,034 B2
(45) Date of Patent: Jul. 28, 2015

(54) SYSTEM AND METHOD FOR IGNITION AND OPERATION OF A HIGH INTENSITY DISCHARGE LAMP

(75) Inventor: Dov Rapson, Avihail (IL)

(73) Assignee: GREENTEK GREEN SOLUTIONS (2009) LTD., Netanya (IL)

( * ) Notice: Subject to any disclaimer, the term of this patent is extended or adjusted under 35 U.S.C. 154(b) by 86 days.

(21) Appl. No.: 14/117,373

(22) PCT Filed: May 14, 2012

(86) PCT No.: PCT/IB2012/052385
§ 371 (c)(1),
(2), (4) Date: Nov. 13, 2013

(87) PCT Pub. No.: WO2012/156892
PCT Pub. Date: Nov. 22, 2012

(65) Prior Publication Data
US 2014/0145642 A1    May 29, 2014

(30) Foreign Application Priority Data

May 17, 2011    (GB) .................................. 1108175.9

(51) Int. Cl.
*H05B 41/295* (2006.01)
*H05B 41/04* (2006.01)
*H05B 41/288* (2006.01)
(Continued)

(52) U.S. Cl.
CPC ............ *H05B 41/04* (2013.01); *H05B 41/2882* (2013.01); *H01J 61/96* (2013.01); *H05B 41/2325* (2013.01); *Y02B 20/204* (2013.01)

(58) Field of Classification Search
USPC ......... 315/49, 56, 59, 46, 50, 94, 96–99, 101, 315/105–107, 112; 313/238, 241–244, 246, 313/249, 251, 252, 256, 326, 331, 335, 631, 313/623–626
See application file for complete search history.

(56) References Cited

U.S. PATENT DOCUMENTS

| 4,245,177 A | 1/1981 | Schmitz |
| 4,328,446 A | 5/1982 | Fallier, Jr. et al. |
| 5,051,665 A | 9/1991 | Garrison et al. |

(Continued)

FOREIGN PATENT DOCUMENTS

| EP | 1768468 A2 | 3/2007 |
| GB | 279053 | 11/1928 |

(Continued)

OTHER PUBLICATIONS

Search and Examination Report, UK Intellectual Property Office, App. No. GB1205030.8, May 1, 2012.

(Continued)

*Primary Examiner* — Tuyet Vo
(74) *Attorney, Agent, or Firm* — Dr. Hanan Farber Patent Agent Ltd.

(57) ABSTRACT

A method for ignition of a ceramic high intensity discharge (HID) lamp. The method includes applying to the electrodes multiple pre-ignition voltage pulses of sufficiently short duration to avoid igniting the HID lamp. The pre-ignition voltage pulses heat the electrodes prior to ignition to avoid arcing in the bores of the capillaries surrounding the electrodes. The ignition circuit is configured subsequent to application of the pre-ignition voltage pulses to apply an ignition pulse to ignite the HID lamp.

20 Claims, 3 Drawing Sheets

(51) Int. Cl.
*H01J 61/96* (2006.01)
*H05B 41/232* (2006.01)

(56) References Cited

U.S. PATENT DOCUMENTS

| | | | |
|---|---|---|---|
| 5,065,072 | A | 11/1991 | Albou et al. |
| 5,339,005 | A | 8/1994 | Byszewski et al. |
| 5,365,151 | A | 11/1994 | Spiegel |
| 5,932,976 | A | 8/1999 | Maheshwari et al. |
| 6,020,691 | A | 2/2000 | Sun et al. |
| 6,404,140 | B1 | 6/2002 | Nerone |
| 7,728,495 | B2 | 6/2010 | Zuk et al. |
| 2002/0145388 | A1 | 10/2002 | Kelly et al. |
| 2009/0230870 | A1 | 9/2009 | Quazi |
| 2009/0322246 | A1* | 12/2009 | Tomohiro .................... 315/287 |
| 2010/0001656 | A1 | 1/2010 | Li |
| 2010/0109543 | A1* | 5/2010 | Kumagai et al. ............. 315/224 |
| 2010/0134033 | A1 | 6/2010 | Terashima et al. |
| 2010/0134034 | A1 | 6/2010 | Ozasa et al. |
| 2010/0141164 | A1 | 6/2010 | Patchornik |
| 2011/0273097 | A1* | 11/2011 | Kuo .............................. 315/159 |

FOREIGN PATENT DOCUMENTS

| | | |
|---|---|---|
| JP | 08195288 A | 7/1996 |
| JP | WO2011122274 A1 | 10/2011 |
| NL | WO2009069061 A1 | 6/2009 |
| WO | WO2008057678 A2 | 5/2008 |
| WO | WO2009114528 A2 | 9/2009 |

OTHER PUBLICATIONS

PCT International Search Report, PCT/IB2012/052385, filing date May 14, 2012.

Search and Examination Report, UK Intellectual Property Office, App. No. GB1108175.9, Jun. 29, 2011.

"Plasma Dynamics During Breakdown in an HID Lamp", Ananth N Bhoj, IEEE Transactions on Plasma Science, vol. 33, No. 2, Apr. 2005.

PCT Written opinion, PCT/IB2012/052385, May 17, 2011.

Informal Comments in response to Written Opinion of the International Searching Authority of PCT/IB2012/052385.

* cited by examiner

SYSTEM AND METHOD FOR IGNITION AND OPERATION OF A HIGH INTENSITY DISCHARGE LAMP

BACKGROUND

1. Technical Field

The present invention relates to a ballast circuit used to ignite and operate a high intensity discharge lamp and, more particularly for igniting and operating a ceramic high intensity discharge lamp.

2. Description of Related Art

A high-intensity discharge (HID) lamp produces light by means of an electric arc between electrodes housed inside an arc tube of a transparent material such as fused quartz or alumina. The tube is filled with both gas and a dose of metal salts. The gas facilitates an initial strike or ignition of an arc. Once the arc is started, the arc heats and evaporates the metal salts. A plasma is formed which greatly increases the intensity of light produced by the arc and reduces power consumption. In typically 1 to 2 minutes, a low powered 70 W HID lamp warms up to produce its rated light output. When the HID lamp is initially cool, an ignition voltage of 4000 volts for instance is typically required to ignite the HID lamp. After ignition, the HID ballast provides alternating current to the lamp at low voltage, e.g. 20-200 Volts. The physical properties of an HID lamp typically determine the operating voltage across the HID lamp.

Reference is now made to FIG. 2 which shows a plan cross-sectional view of ceramic HID lamp 14, according to conventional art. Ceramic HID lamp 14 includes electrodes 20 extending at the proximal ends of electrodes 20 into an arc chamber 28 which is interior to an arc tube 26. Electrodes 20 connect electrically at the distal ends to the output of the ballast circuit supplying the lamp 14. Electrodes 20 pass through respective bores 24 of capillaries 25 and are sealed inside a portion of bore 24 by seal 22 near the distal ends of capillaries 25.

Lamp 24 of construction as shown in FIG. 2 is known as a "ceramic" HID lamp in distinction with a "quartz" HID lamp with arc tube of material fused silica or polycrystalline quartz. In quartz HID lamps, the seal to the electrode is formed by pinching the tube material while in a viscous semi-liquid state onto the electrode near the entrance to the arc chamber. In ceramic HID lamps of ceramic materials other than fused silica or quartz, the pinch seal is not available and seal 22 is formed by melting glass or ceramic frit inside distal portions of bore 24 within capillaries 25. U.S. Pat. Nos. 7,701,142, 7,728,495 and US patent application publication US20020145388 are representative references describing ceramic arc lamps.

Ceramic HID lamps 14 may provide improvements over the quartz metal halide (MH) lamps, both in the light efficacy, color temperature and color rendering index (CRI). Normally the color temperature of MH quartz lamps is over 4000 kelvin with CRI of 65 to 70. Ceramic lamps 14 typically may provide warmer light typically around 3200K with CRI of 90. Light efficacy may be over 110 lumen per Watt (L/W), while from quartz MH lamps the efficacy is typically around 90 L/W.

Most HID lamps, including ceramic HID lamps 14 are operated at low frequency of less than 400 Hz. However, operating at high frequency range, over 100 kHz may provide advantages such as longer life, lower lumen depreciation, stable color and CRI. For instance, lumen depreciation of a quartz metal halide (MH) lamp at low frequency operation after 8000 hours may go down as low as 50% of the initial value, while operating the same lamp at high frequency may show lumen depreciation of only less than 15% at 8000 hours of operation. Ignition with high frequency may improve even further HID lamp performance over life time comparing to the conventional low frequency ignition methods. However, it is known that high frequency operation on HID lamps may result in acoustic resonances. Acoustic resonance typically may cause a flicker of the light output. Above 100 kHz, most lamps may operate free of acoustic resonances. One known way to eliminate acoustic resonances in quartz HID lamps at high frequency may be by implementing low frequency modulation superimposed on the high frequency operation waveform.

Thus there is a need for and it would be advantageous to have a system and method for ignition and operation of ceramic HID lamps 14 at high frequency reliably over a long lifetime with minimal deterioration of performance and without acoustic resonance.

The term "bore" 24 hereinafter refers to the hollow portion interior to capillary 25 and proximal to seal 22. The term "proximal" herein refers to the ends of electrodes 20 and/or capillaries 25 which protrude into arc chamber 28. The term "distal" as used herein refers to outer ends of electrodes 20 and/or capillaries 25 more distant from the center of arc chamber 28.

The term "peak voltage" as used herein refers to absolute value peak voltage.

The term "high frequency" as used herein in the context of high frequency normal operation of a HID lamp refers to an operation around or greater than 100 kiloHertz.

The term "low frequency" as used herein in the context of low frequency normal operation of a HID lamp refers to an operation at a frequency of order of magnitude or less than 400 Hertz.

BRIEF SUMMARY

According to a feature of the present invention there is provided a high frequency ballast for ignition and operation of a ceramic high intensity discharge (HID) lamp. The ceramic HID lamp includes an arc chamber and two capillaries each connected to the arc chamber at respective proximal ends of the capillaries. Two electrodes are each sealed within the capillaries by respective seals near the distal ends of the capillaries. The electrodes extend from the seals through respective bores in the capillaries and protrude into the arc chamber at the proximal ends of the capillaries. The high frequency ballast includes an inverter circuit having output terminals, an ignition circuit connected to the output terminals. The electrodes of the HID are adapted to connect to the output terminals of the ballast. The ignition circuit is configured by the microprocessor to apply multiple pre-ignition voltage pulses to the electrodes of the ceramic HID lamp. The pre-ignition voltage pulses may have a time period of fifty to two hundred milliseconds. The pre-ignition voltage pulses typically have a peak voltage of 2000-4000 volts and a frequency of 100-500 kilohertz. The ignition circuit may be configured by the microprocessor to limit duration of the pre-ignition voltage pulses to avoid arcing in the bores of the capillaries surrounding the electrodes. The ignition circuit may be configured by the microprocessor during the pre-ignition pulses to momentarily ignite the ceramic HID lamp and cause thereby significant current to momentarily flow. During the pre-ignition pulses an arc if produced is substantially only between the proximal ends of the electrodes.

The ignition circuit is configured by the microprocessor to apply a final ignition pulse and full operation, only after the electrodes are sufficiently heated by the pre-ignition pulses to avoid arcing in the bores of the capillaries during the final ignition pulse.

The inverter circuit may be configured to apply an operational voltage to the electrodes, while alternating between a low frequency waveform and high frequency waveform or alternating between a zero voltage time interval and a high frequency waveform. The ratio between the time duration of the high frequency waveform to the time duration of the low frequency waveform (or zero voltage) is selected to be between 8:1 to 12:1.

According to a feature of the present invention there is provided a method for ignition of a ceramic high intensity discharge (HID) lamp. The ceramic HID lamp includes an arc chamber and two capillaries each connected to the arc chamber at respective proximal ends of the capillaries. Two electrodes are each sealed within the capillaries by respective seals near the distal ends of the capillaries. The electrodes extend from the seals through respective bores in the capillaries and protrude into the arc chamber at the proximal ends of the capillaries. The method includes applying to the electrodes multiple pre-ignition voltage pulses adapted to avoid arcing in the bores of the capillaries surrounding the electrodes. The pre-ignition pulses PIP may momentarily ignite the ceramic HID lamp and cause significant current to momentarily flow. During the pre-ignition pulses an arc may be formed but substantially only between the proximal ends of the electrodes and not in the bore. The ignition circuit is configured by the microprocessor to apply to the electrodes between three and ten pre-ignition pulses, each pre-ignition pulse followed by a time delay 0.5-1.5 seconds of substantially zero voltage. The duration of the pre-ignition pulses is limited by stopping the pre-ignition pulses to avoid arcing in the bores of the capillaries surrounding the electrodes. The pre-ignition voltage pulses may have a time period of fifty to two hundred milliseconds. The pre-ignition voltage pulses typically have a peak voltage of 2000-4000 volts and a frequency of 100-500 kilohertz. The pre-ignition voltage pulses may heat the electrodes prior to normal operation to avoid arcing in the bores of the capillaries surrounding the electrodes. The pre-ignition voltage pulses may be configured to have sufficiently short duration to avoid arcing in the bores of the capillaries surrounding the electrodes. Alternatively or in addition, the pre-ignition pulses are current limited to avoid arcing in the bores of the capillaries surrounding the electrodes.

The ignition circuit is configured to apply a final ignition pulse subsequent to the pre-ignition voltage pulses to ignite the HID lamp with an arc only substantially between the proximal ends of the electrodes. Subsequent to the final ignition pulse, the HID lamp is operated with an operating voltage which alternates between high frequency and low frequency waveforms or alternates between a high frequency waveform and substantially zero voltage time intervals. A ratio between the time duration of the high frequency waveform to the time duration of the low frequency waveforms is selected to eliminate acoustic resonance in the HID lamp. The ratio between the time duration of the high frequency waveform to the time duration of the low frequency waveform is typically selected to be between 8:1 to 12:1.

According to a feature of the present invention there is provided a method for high frequency operation of a high-intensity discharge lamp. The method includes applying an operational voltage to the electrodes, while alternating between a low frequency waveform and high frequency waveform or while alternating between time intervals of substantially zero voltage and high frequency waveforms. A ratio between the time duration of the high frequency waveform to the time duration of the low frequency waveforms is selected to eliminate acoustic resonance in the HID lamp. The ratio between the time duration of the high frequency waveform to the time duration of the low frequency waveform is typically selected to be between 8:1 to 12:1.

The foregoing and/or other aspects will become apparent from the following detailed description when considered in conjunction with the accompanying drawing figures.

BRIEF DESCRIPTION OF THE DRAWINGS

The invention is herein described, by way of example only, with reference to the accompanying drawings, wherein.

DETAILED DESCRIPTION

Figure 1:
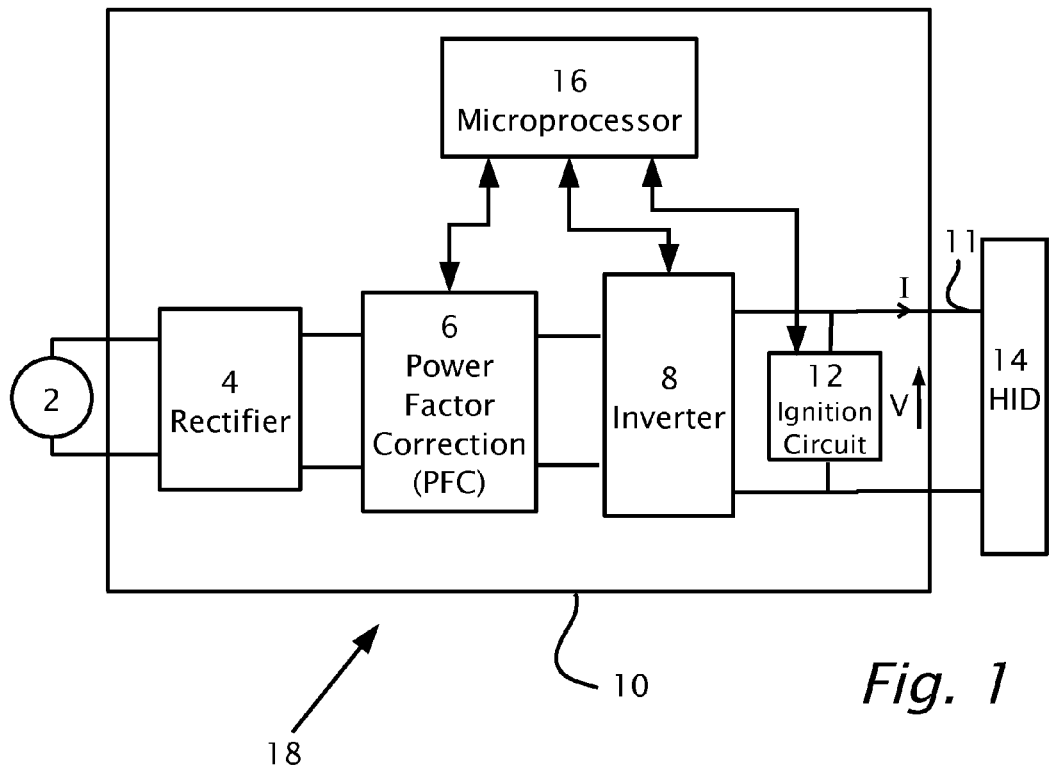
FIG. 1 shows a high frequency ballast circuit for operating a ceramic high-intensity discharge (HID) lamp, according to features of the present invention.
Figure 2:
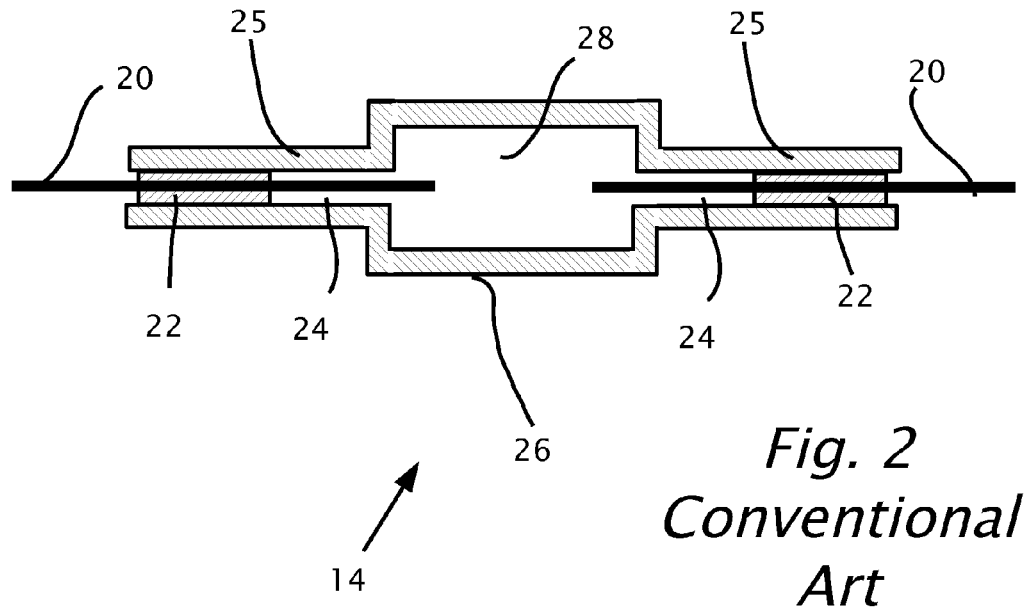
FIG. 2 shows a plan cross-sectional view of a ceramic HID lamp, according to conventional art.

Reference will now be made in detail to embodiments of the present invention, examples of which are illustrated in the accompanying drawings, wherein like reference numerals refer to the like elements throughout. The embodiments are described below to explain the present invention by referring to the figures.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, embodiments of the present invention are directed to systems and methods for ignition and operation of ceramic HID lamp 14 at high frequency and extending the working life of ceramic high-intensity discharge (HID) lamps. Specifically, using a conventional method of ignition as applied to quartz HID lamps to a ceramic HID lamp 14, a high frequency ignition pulse is applied to the lamp. However, using the conventional ignition method, arc formation typically does not occur for several seconds after the ignition pulse starts during which time the lamp is warming. During the warming period, e.g. 5-10 seconds, plasma formation, glow and/or arcing may occur in bore 24 around electrode 20, prior to arc formation between tips of electrodes 20. The plasma and/or arcing in bore 24 prior to ignition causes any number of effects which are deleterious to the long term reliability of lamp 14. These effects may include heating of capillaries 25 and seal 22 which may cause thermal temperature gradients and cracking and/or differential thermal expansion; corrosion from active metallic ions in the plasma formed and sputtering of electrode 20 and/or seal 22.

It has been found that conventional high frequency ignition as applied to quartz HID lamps cause ceramic HID lamps 14 to have a short lifetime because of plasma and/or arc formation in bore 24 around electrode 20.

Another feature of the present invention is directed to eliminate acoustic resonance during operation of the HID lamp subsequent to ignition.

Referring now to the drawings, FIG. 1 shows a ballast circuit 10, according an embodiment of the present invention. Ballast circuit 10 has an input connected to an alternating current (AC) power supply 2 and output terminals 11 connected to high-intensity discharge (HID) lamp 14. High intensity discharge (HID) lamp 14 connects to AC output terminals 11. A rectifier 4 has an input from mains electricity, typically a 120/240 root mean square (RMS) alternating current (AC) voltage with a frequency of 60/50 Hertz. Rectifier 4 rectifies mains electricity to produce a direct current (DC) output which is input into power factor correction (PFC) circuit 6. The DC output of PFC 6 is connected to the input of inverter circuit 8; inverter 8 may be a "half bridge" or a "full bridge" inverter circuit for produces a controlled AC current output for normal operation of HID lamp 14. Ignition circuit 12 is connected in parallel to AC output terminals 11. Microprocessor 16 is operatively attached to PFC 6, inverter 8 and ignition circuit 12 via control lines. Optionally, microprocessor 16 performs monitoring of ignition circuit 12 and inverter circuit 8. Microprocessor 16 is programmed to control ballast circuit 10 according to features of the present invention as detailed in the following figures.

Figure 3A:
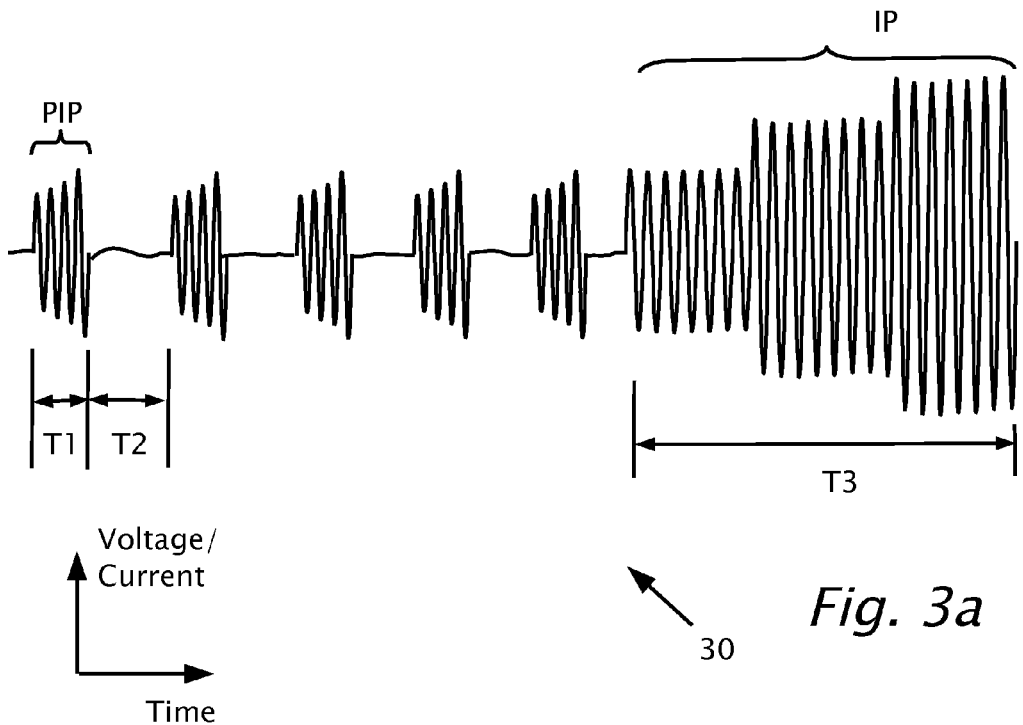
FIGS. 3a and 3b show schematically an ignition waveform and method respectively, according to features of the present invention.
Figure 3B:
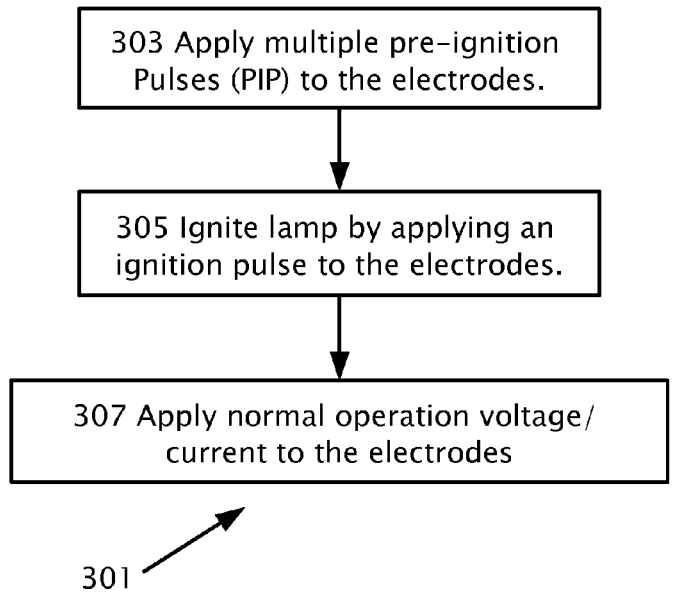

Reference is now made to FIGS. 3a and 3b which show schematically an ignition waveform 30 and method 301 respectively, according to a feature of the present invention, directed to eliminate arcing in bore 24 of HID ceramic lamp 14. In step 303, pre-ignition pulses PIP are applied across electrodes 20 by ballast 10. Typically, there may be between three and ten pre-ignition pulses PIP applied to electrodes 20. FIG. 3a shows five pre-ignition pulses PIP applied to electrodes 20. Pre-ignition pulse PIP has a typically sinusoidal waveform including a pulse width T1 of 50-200 milliseconds, typically about 100 millisecond, peak voltage of 2000-4000 volts, typically 3200 volts and a frequency of 100-500 kilohertz, typically about 300 kHz. Each pre-ignition pulse PIP is followed by a time delay T2 of 0.5-1.5 seconds of substantially zero voltage applied to electrodes 20. (Time in FIG. 3a is not shown to scale). After pre-ignition pulses PIP are applied, an ignition pulse IP is applied (step 305). Ignition pulse IP has a peak voltage of 4000 volts and a frequency of 100-500 kilohertz, typically 300 kilohertz for a time period T3 of 800-1500 millisecond. Ignition pulse IP applied to electrodes 20 typically causes ceramic HID lamp 14 to ignite. Once lamp 14 is ignited, normal operation of lamp 14 continues in step 307 by applying an operational voltage and current to electrodes 20.

It is found that when pre-ignition pulses PIP are applied (step 303), electrodes 20 heat up without causing arcing in bore 24. According to a feature of method 301, ignition (step 305) occurs with arcing only between the proximal tips of electrodes 20 during the application of ignition pulse IP without any prior visible glow and/or arcing in bore 24.

In different embodiments of the present circuit, pre-ignition pulses PIP may be generated using a resonant ignition circuit 12 or by a non-resonant or semi-resonant ignition circuit 12. Ignition circuit 12 may be configured to produce pre-ignition pulses PIP which momentarily light HID lamp 14 with an arc formed momentarily between the proximal ends of electrodes 20 and without arcing in bore 24. Alternatively, ignition circuit 12 may be configured produce pre-ignition pulses PIP which do not momentarily light HID lamp 14 and do not cause any significant arcing or current flow but do sufficiently heat electrodes 20 sufficiently to avoid arcing in the region of bore 24 during ignition pulse IP and subsequent normal operation.

Figure 4A:
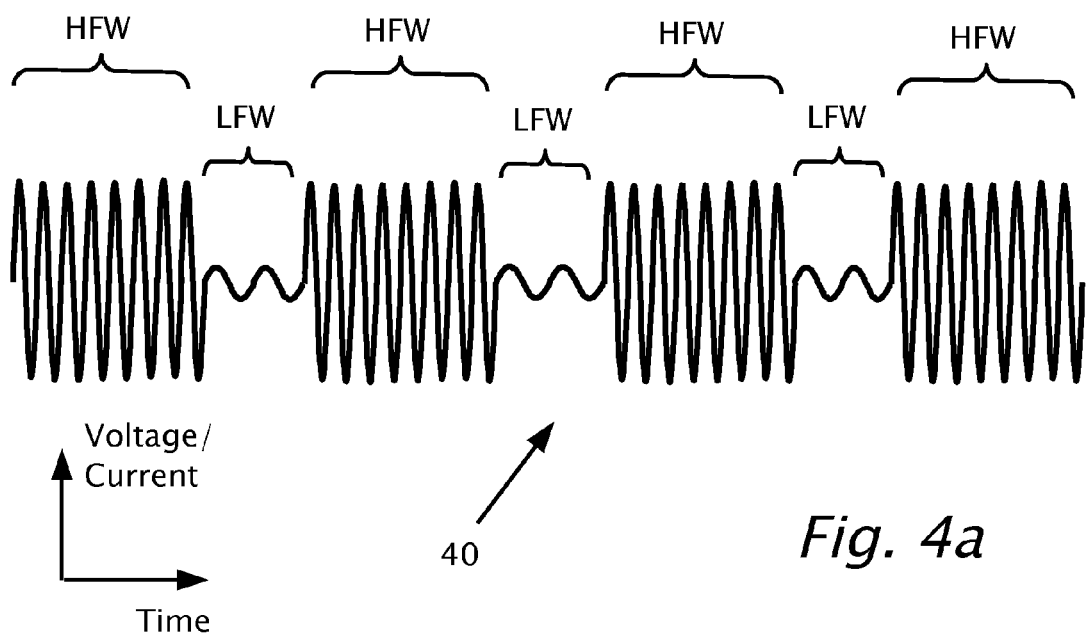
FIGS. 4a and 4b show a normal operation waveform and method respectively, according to features of the present invention.
Figure 4B:
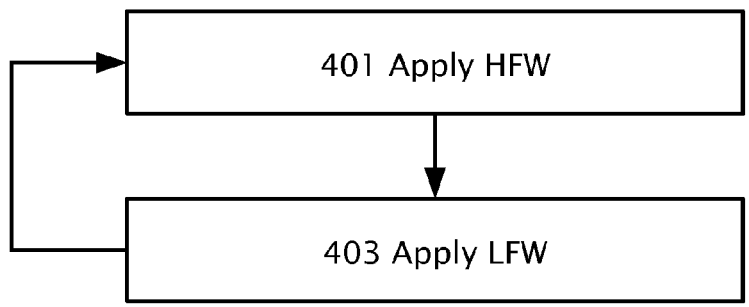

Reference is now made to FIGS. 4a and 4b which show a normal operation waveform 40 and method 307 respectively, according to features of the present invention. Waveform 40 and method 307 respectively are directed towards the prevention of acoustic resonance in lamp 14 during the normal operation of lamp 14.

According to method 307, in steps 401, 403 inverter circuit 8 of ballast 20 applies alternating waveforms of high frequency waveform HFW and low frequency waveform LFW to electrodes 20. Alternatively, the time intervals marked as LFW may have substantially zero voltage so that during operation, high frequency waveform HFW alternates with time intervals of substantially zero voltage. High frequency waveform HFW has a frequency over 100 kHz, typically 150 kilohertz, peak to peak voltage level of 70-250 Volts, typically 110 Volts and may be applied to electrodes 20 by ballast 10 for a period of 5-20 milliseconds, typically 10 milliseconds. Low frequency pulse LFW has a frequency of above 100 Hz, peak to peak voltage level of 10 volts and may be applied to electrodes 20 by ballast 10 for a period of 0.5 to 2 milliseconds, typically 1 millisecond. The time length of each low frequency pulse LFW may be modified to get smooth and stable operation of lamp 14, without creating any noticeable flickering. Typically a ratio between 8:1 to 12:1, typically about 10:1 of respective time durations between high to low frequency waveforms is sufficient to eliminate flickering due to acoustic resonances at high frequency. (Time is not shown to scale in FIG. 4a) It may be preferable to synchronize the waveforms HFW and LFW to the mains grid frequency, or other low frequency available in ballast 10. Method 307 using waveform 40 applied to lamp 14 does not produce flickering in lamp 14 unlike the conventional high frequency ballast applied to a lamp 14 which does cause flickering in lamp 14.

Several models of ceramic metal halide HID lamps were tested, typically of 250 Watts and 400 Watts specifically: "Power Ball®" manufactured by OSRAM, CMH Master Color manufactured by Philips Lighting and Constant Color manufactured by General Electric (GE). Similar lamps include "CosmoPolis®" manufactured by Philips Lighting and General Electric "Streetwise®". In all cases, after 6000 hours of high frequency operation including ignition every 11 hours and 1 hour wait, using ballast circuit 18 according to method 301, lumen depreciation was insignificant and electrodes appear in good working order. In comparison, when the same lamp models were tested using conventional high frequency ballasts significant reduction ~25% of lumen efficiency was measured and the electrodes appeared damaged, and at least one of 6 lamps failed to operate, due to a crack performed in the bore 24 area, resulting in evaporation of all metal halides gases.

The definite articles "a", "an" is used herein, such as "an ignition pulse", "a frequency" have the meaning of "one or more" that is "one or more ignition pulses" or "one or more frequencies".

Although selected embodiments of the present invention have been shown and described, it is to be understood the present invention is not limited to the described embodiments. Instead, it is to be appreciated that changes may be made to these embodiments without departing from the principles of the invention, the scope of which is defined by the claims and the equivalents thereof.

The invention claimed is:

1. A high frequency ballast for ignition and operation of a ceramic high intensity discharge (HID) lamp including an arc chamber and two capillaries each connected to the arc chamber at respective proximal ends of the capillaries, two electrodes each sealed within the capillaries by respective seals near the distal ends of the capillaries, wherein the electrodes extend from the seals through respective bores in the capillaries and protrude into the arc chamber at the proximal ends of the capillaries, the high frequency ballast comprising:

an inverter circuit having output terminals; and an ignition circuit connected to said output terminals, wherein the electrodes are adapted to connect to said output terminals;

wherein the ignition circuit is configured by said microprocessor to apply a plurality of pre-ignition voltage pulses to the electrodes;

wherein the ignition circuit is configured by said microprocessor during the pre-ignition pulses to momentarily ignite the ceramic HID lamp and cause thereby significant current momentarily flow, wherein during said pre-ignition pulses an arc is produced substantially only between the proximal ends of the electrodes, wherein the ignition circuit is configured by said microprocessor to apply a final ignition pulse and to operate the lamp, only after the electrodes are sufficiently heated by said pre-ignition pulses to avoid arcing in the bores of the capillaries during the final ignition pulse.

2. The high frequency ballast of claim 1, wherein the pre-ignition voltage pulses have a time period of fifty to two hundred milliseconds.

3. The high frequency ballast of claim 1, wherein the pre-ignition voltage pulses have a peak voltage of 2000-4000 volts.

4. The high frequency ballast of claim 1, wherein the pre-ignition voltage pulses have a frequency of 100-500 kilohertz.

5. The high frequency ballast of claim 1, wherein the ignition circuit is configured by said microprocessor to limit duration of the pre-ignition voltage pulses to avoid arcing in the bores of the capillaries surrounding the electrodes.

6. The high frequency ballast of claim 1, wherein the inverter circuit is configured to apply an operational voltage to the electrodes, while alternating between zero voltage and high frequency waveform.

7. The high frequency ballast of claim 1, wherein the ignition circuit is configured by said microprocessor to apply to the electrodes between three and ten pre-ignition pulses.

8. The high frequency ballast of claim 7, wherein each pre-ignition pulse is followed by a time delay 0.5-1.5 seconds of substantially zero voltage.

9. The high frequency ballast of claim 1, wherein the inverter circuit is configured to apply an operational voltage to the electrodes, while alternating between a low frequency waveform and a high frequency waveform.

10. The high frequency ballast of claim 9, wherein a ratio between the time duration of the high frequency waveform to the time duration of the low frequency waveform is selected to be between 8:1 to 12:1.

11. A method for ignition of a ceramic high intensity discharge (HID) lamp, wherein the HID lamp includes an arc chamber and two capillaries each connected to the arc chamber at respective proximal ends, two electrodes each sealed within the capillaries by respective seals near the distal ends of the capillaries, wherein the electrodes extend from the seals through respective bores in the capillaries and protrude into the arc chamber at the proximal ends of the capillaries, the method comprising the step of:

applying to the electrodes a plurality of pre-ignition voltage pulses adapted to avoid arcing in the bores of the capillaries surrounding the electrodes by momentarily igniting the ceramic HID lamp thereby causing significant current to momentarily flow thereby during said pre-ignition pulses forming an arc substantially only between the proximal ends of the electrodes; and subsequent to said applying said pre-ignition voltage pulses, applying a final ignition pulse to operate the lamp, only after the electrodes are sufficiently heated by said pre-ignition pulses to avoid arcing in the bores of the capillaries during the final ignition pulse.

12. The method of claim 11, further comprising:
limiting the duration of the pre-ignition pulses by stopping the pre-ignition pulses to avoid arcing in the bores of the capillaries surrounding the electrodes.

13. The method of claim 11, wherein the pre-ignition voltage pulses have a time period of fifty to two hundred milliseconds.

14. The method of claim 11, wherein the pre-ignition voltage pulses have a peak voltage of 2000-4000 volts.

15. The method of claim 11, wherein the pre-ignition voltage pulses have a frequency of 100-500 kilohertz.

16. The method of claim 11, further comprising:
heating the electrodes prior to normal operation, thereby avoiding arcing in the bores of the capillaries surrounding the electrodes, wherein said heating is performed by the pre-ignition pulses.

17. The method of claim 11, wherein the pre-ignition voltage pulses are configured to have sufficiently short duration to avoid arcing in the bores of the capillaries surrounding the electrodes.

18. The method of claim 11, further comprising the step of:
current limiting the pre-ignition pulses to avoid arcing in the bores of the capillaries surrounding the electrodes.

19. The method of claim 11, further comprising the step of:
subsequent to said applying said pre-ignition voltage pulses, applying said final ignition pulse to ignite the HID lamp, wherein an arc is substantially only between the proximal ends of the electrodes.

20. The method of claim 11, further comprising the step of:
subsequent to the final ignition pulse, operating said HID lamp with an operating voltage which alternates between high frequency and low frequency waveforms.

* * * * *